April 12, 1932. A. G. ROTINOFF 1,853,379
CAISSON AND METHOD OF AND MEANS FOR SINKING THE SAME
Filed Dec. 29, 1926 6 Sheets-Sheet 1
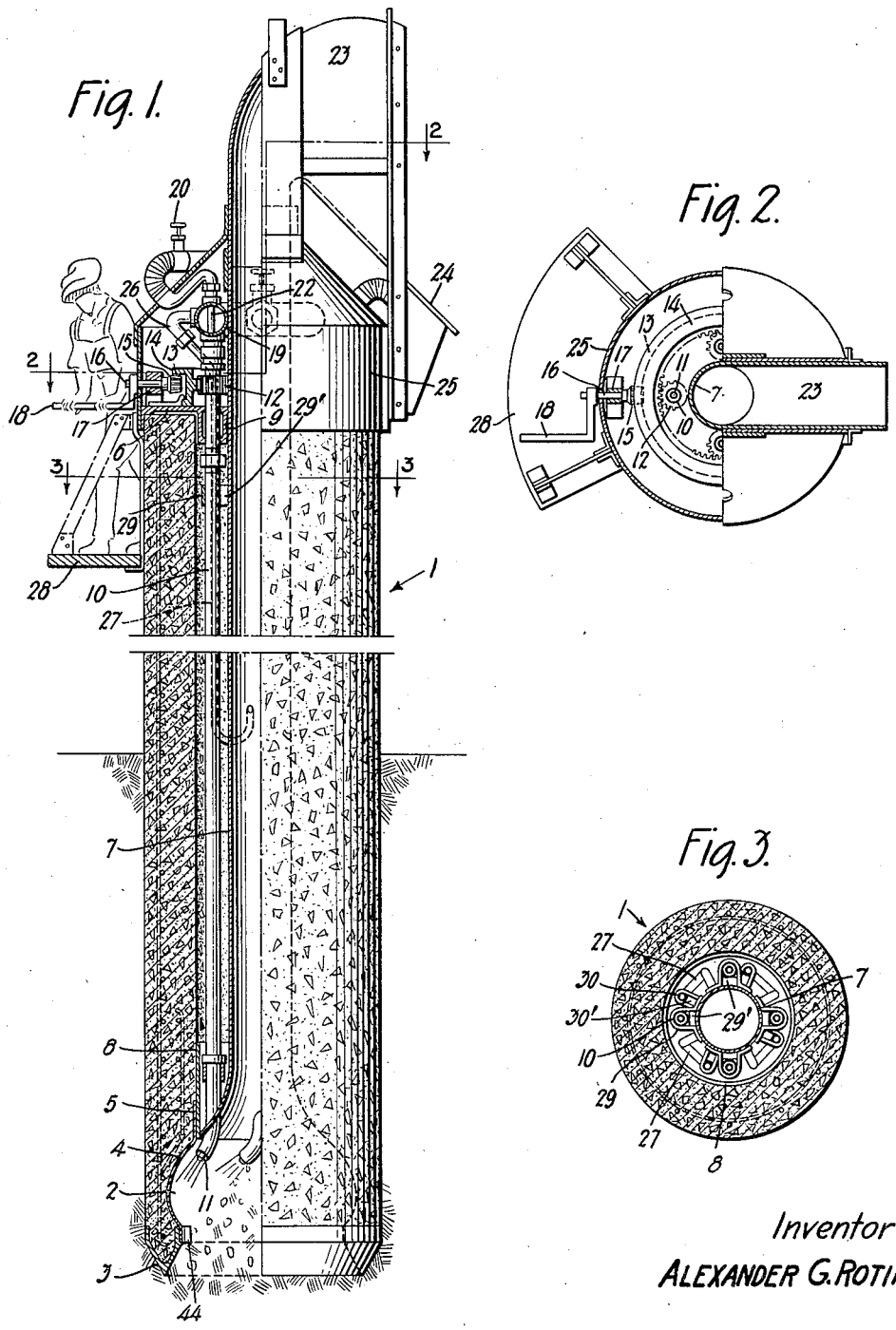
Inventor
ALEXANDER G. ROTINOFF
by Marks & Clerk
His Attys

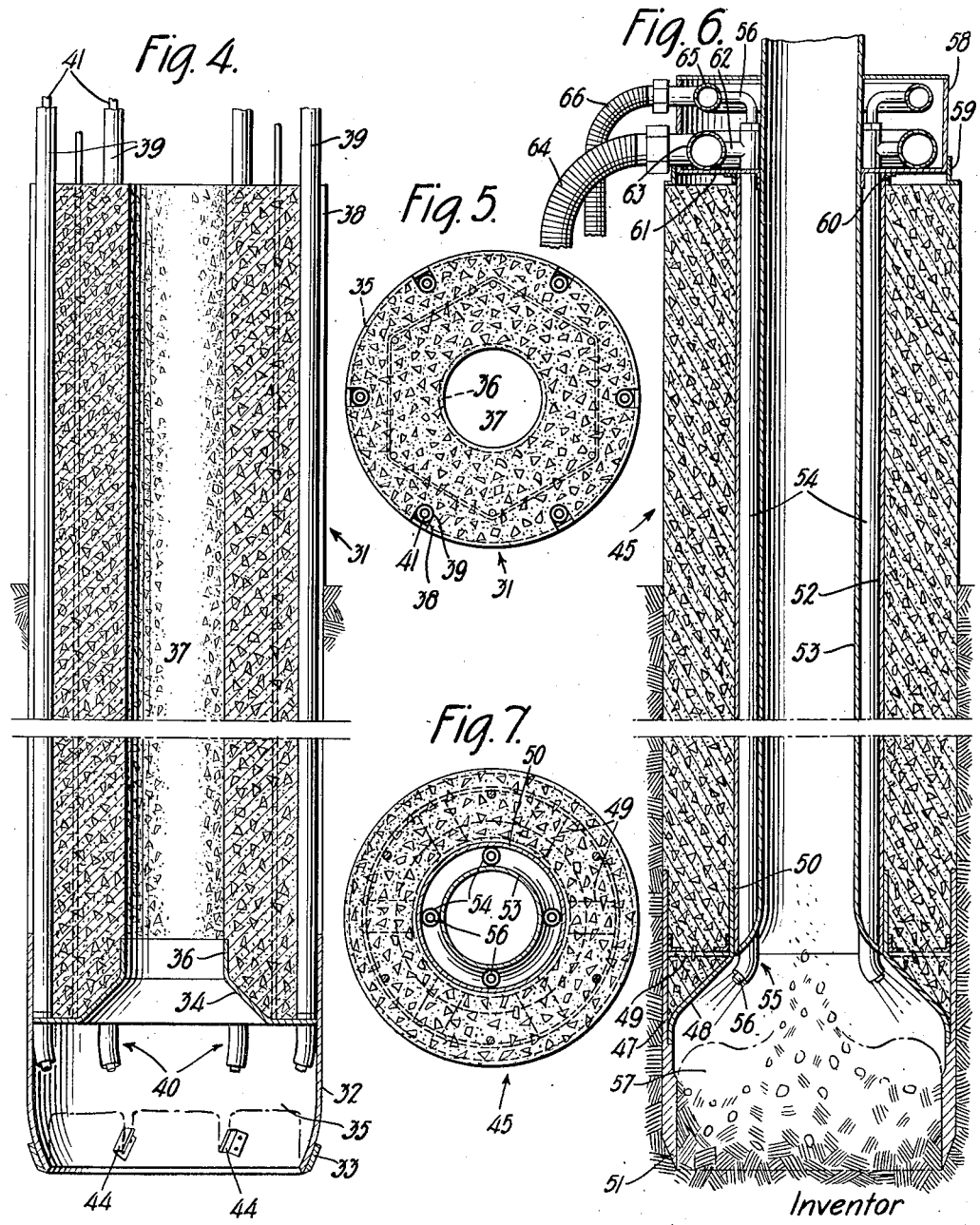

April 12, 1932. A. G. ROTINOFF 1,853,379
CAISSON AND METHOD OF AND MEANS FOR SINKING THE SAME
Filed Dec. 29, 1926 6 Sheets-Sheet 3
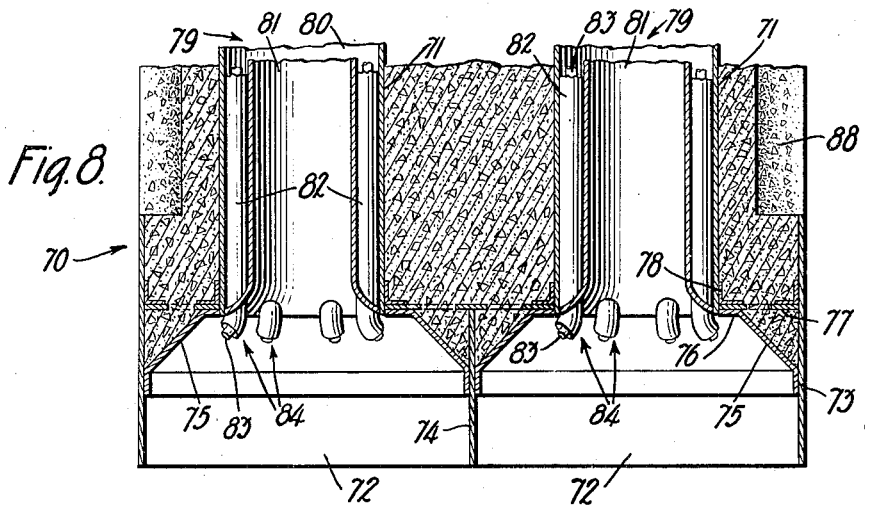
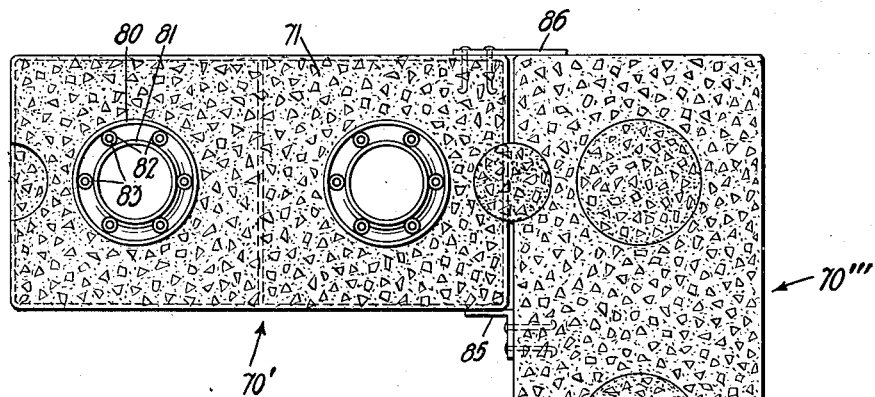
Inventor
ALEXANDER G. ROTINOFF
by Marks & Clerk
His Att'ys

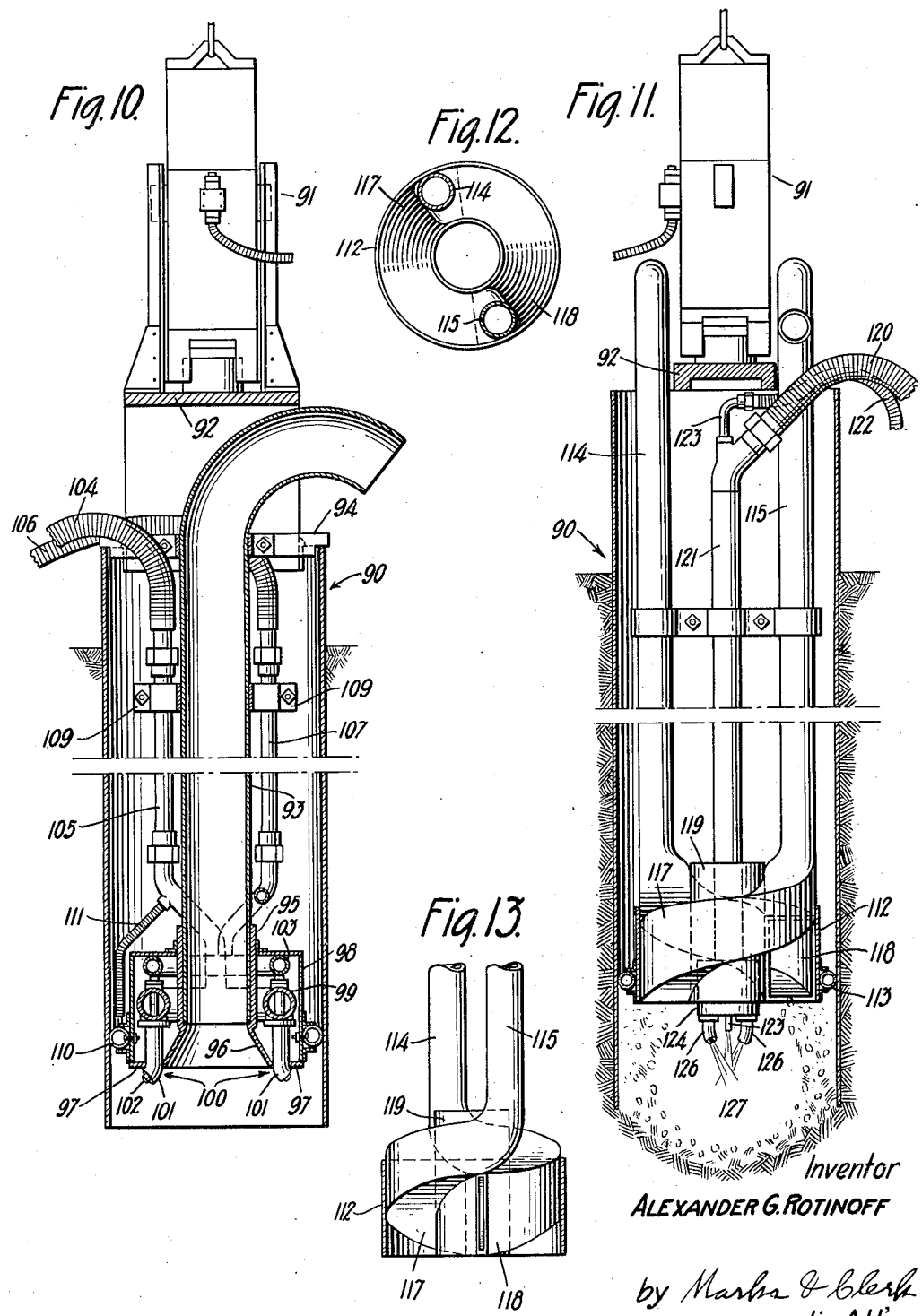

Inventor
ALEXANDER G. ROTINOFF by Marks & Clerk
His Att'ys

April 12, 1932. A. G. ROTINOFF 1,853,379
CAISSON AND METHOD OF AND MEANS FOR SINKING THE SAME
Filed Dec. 29, 1926 6 Sheets-Sheet 6

Inventor
ALEXANDER G. ROTINOFF by Marks & Clark
His Attys

Patented Apr. 12, 1932

1,853,379

UNITED STATES PATENT OFFICE

ALEXANDER G. ROTINOFF, OF LONDON, ENGLAND

CAISSON AND METHOD OF AND MEANS FOR SINKING THE SAME

Application filed December 29, 1926. Serial No. 157,637.

This invention relates to caissons and method of and means for sinking caissons for foundation work designed to carry concentrated loads to considerable depth and for building subterranean walls of heavy type.

One of the principal objects of the present invention is to provide a method of sinking such caissons or walls whereby the use of hand work for excavation resulting in sinking of caissons may be avoided and the use of labor saving devices made possible. Another object of the invention is to provide a method of sinking caissons of smaller sections, for example five feet (5') in diameter or less, than can be sunk by using the pneumatic system. Another object of the invention is to provide a method of sinking a caisson by compressing and dislocating the soil without excavation as long as the condition of the ground permits and then further sinking the caisson to the desired depth by excavation. Another object of the invention is to provide a method whereby a heavy continuous subterranean wall can be built by sinking caissons side by side and making their joints water tight. Another object of the invention is to provide a method of sinking a caisson such as to prevent any disturbance of the ground outside of the caisson or injury to adjacent foundations during the sinking operations of the caisson. Another object of the invention is to provide a method of sinking caissons of any desired shape in which the excavating is done independently in a number of sections at the bottom of the caisson.

Further objects of the invention are to provide improved caissons and caisson sinking means as hereinafter described and claimed.

In general, the method of sinking caissons according to the present invention consists in breaking up and disintegrating the ground from beneath the caisson by powerful air jets, which may, if desired, be assisted by water jets and by cutting means within the caisson itself, the broken up and disintegrated material being blown out of the caisson through a discharge passage constituting the upper end of the operative chamber within the caisson. The water jets when such are employed help to soften and loosen the soil to be broken up and blown out, but I depend upon the air jets and the expansive force of the air to effect the actual disintegration and expulsion of the soil from the caisson so that when excavation is completed a cavity is formed which is free from water and ready for the commencement of foundation or other construction, such as filling the cavity with concrete or other material.

The nozzles for directing the jets of compressed air and of water when the latter is employed may be arranged in different ways. For example, the nozzles of the jets may be arranged to direct the jets parallel to the interior surface of the wall of the chamber which may be shaped in a stream line form to turn the jets gradually to the center and by the combined action of the jets start an upward flow through the discharge pipe at a sufficient velocity to force the débris or excavated material out through the discharge tube. The nozzles may be flexibly connected with the pipes to enable them to move in desired directions. In certain cases, the nozzles may be arranged to vibrate by their own propulsion or rotate and create a whirlpool effect for forcing the material out through the discharge tube. The discharge tube may be made of cross-sectional area corresponding to the power of the jets in order to maintain the required velocity of flow to force the heavy material from the bottom of the caisson to the outlet of the discharge passage where it is ejected. The velocity of flow in the discharge passage may be increased by means directing jets of compressed air into the flow in the discharge pipe. For making the handling and fitting of the parts easy and quick and to enable repeated use thereof, the jet-supply pipes and the discharge tube may be combined into a single unit which may be readily lowered into the space provided for it in the caisson, enabling different vertical adjustments of the nozzles and control from the top of the caisson of the direction of the jets as required by the character of work. The jet-supply pipes may be fitted with quick-acting valves to produce, if necessary, a series of explosions with the compressed air jets instead of having continuous flow.

In a steel tube caisson such interior unit may be loose and the space between the periphery of such unit and the caisson may be sealed by means of a tube or tire filled automatically by fluid under pressure.

Although the caissons are in general formed completely before sinking, they may be built up in sections during the sinking thereof. This may be effected by forming the lower end with the chamber and exhaust tube and an outer cylindrical casing; placing on and securing to the finished portion of the caisson a section comprising an outer tube and an inner tube fastened together, the inner tube forming an extension of the discharge tube of the preceding section and the outer tube forming an extension of the cylindrical casing of the preceding section; and filling with concrete the space between the outer and inner tubes of the new section.

Other features and advantages will appear upon consideration of the following detailed construction and of the drawings, in which:

Figure 1 is a half in vertical section view illustrating means adapted to carry out the invention according to one form thereof;

Figure 2 is a view in section taken along the line 2—2 of Figure 1;

Figure 3 is a view in section taken along the line 3—3 of Figure 1;

Figure 4 is a view similar to Figure 1 but illustrating other means for carrying out the invention;

Figure 5 is a view in section of the structure shown in Figure 4;

Figure 6 is a view similar to Figures 1 and 4 but illustrating other means for carrying out the invention;

Figure 7 is a view in cross section of the structure shown in Figure 6;

Figure 8 is a vertical section of a further form of caisson for carrying out the invention;

Figure 9 is a top plan view showing caissons similar to that of Figure 8 assembled to form a wall;

Figure 10 is a view of a further form of apparatus for sinking caissons;

Figure 11 is a sectional view illustrating a further arrangement for carrying out the present invention;

Figure 12 is a top plan view partly in section of the lower end of the excavating device;

Figure 13 is a fragmentary view taken at right angles to the section in Figure 11;

Figure 14:
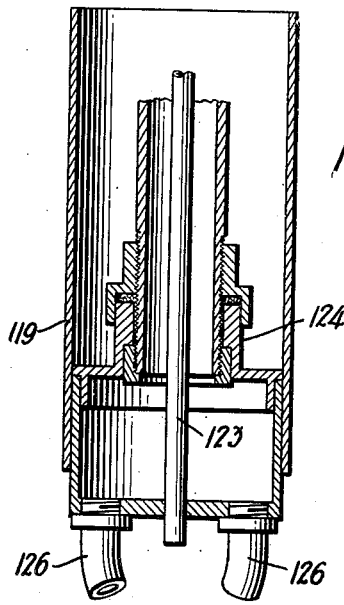
Figure 14 is a detail vertical sectional view of a part at the lower end of Figure 11.

As disclosed in Fig. 1, there is a caisson 1 which is constructed preferably of reinforced concrete and having a chamber 2 at the lower end of the caisson. Preferably the caisson is provided at its lower part with a cutting edge which may be in the form of a cutting shoe 3 and the chamber is provided with a metal lining member 4 extending from the inside edge of the cutting shoe 3 to the inside of the caisson proper and terminating in a sleeve 5 flush with the inner surface of the concrete of the caisson. The portion of the caisson so far described is permanent but in sinking the caisson use is made of apparatus supported on the caisson and extending down through the same to the chamber. This removable part comprises a cap or platform 6 having a central opening of considerably less diameter than the opening of the caisson 1 and carrying a discharge tube 7 which extends through said central opening to the chamber and has its lower end flared outwardly to substantially fit the opening at the upper end of the chamber 2 and being connected as by welding with an upwardly extending sleeve 8 which fits into sleeve 5.

Extending downwardly from the platform 6 are bearings 9 in which are journalled compressed air-supply tubes 10 which extend down to and through openings in the flared lower end of the tube 7 where they are turned slightly out of line at a point sufficiently low to permit them to turn in the said openings. In each of the tubes 10, there is an inner tube 11 for a purpose to be brought out hereinafter. Secured to each tube 10 above the platform 6, there is a gear 12 meshed with teeth 13 on the interior of an annular member 14 which is also provided on the lower side of an outwardly extending horizontal flange thereof with teeth engaging a gear 15 on a shaft 16 mounted in a bearing 17 fixed on the platform 6 and provided with a crank 18 for manual or motor operation.

Each tube 10 at its upper end is rotatably connected with an annular supply pipe 19, the connections being such that a seal is maintained at all times. In carrying out the present invention, air is supplied through the supply pipe 19 to the outer tubes 10, water being supplied to the inner tubes 11 by one or more supply pipes 20 connected with the upper ends of inner tubes 11 which extend upwardly through the supply pipe 19. It should be understood that each inner pipe or tube 11 is mounted for rotation and is connected with the corresponding outer tube 10 to rotate therewith. At its upper end the tube 7 is provided with an enlarged mouth 23 which opens over an inclined platform 24. The operating parts on the platform 6 may be protected by a casing 25. The supply pipe 19 is also connected with pipes 27 which extend downwardly into the caisson to the depth required and are curved to the side and then inwardly and upwardly through the wall of the tube 7 so that the fluid may be forced upwardly therein in jets. The caisson 1 is herein illustrated as built of reinforced concrete but it should be understood that the caisson might be built of masonry or other material.

In practice, the caisson 1 is preferably built of its approximate final length but if the required length is too great, for instance one hundred feet (100'), the caisson may be built in sections. The caisson is erected on the site and is guided by suitable means in its descent. Ordinarily the caisson will sink by gravity to a certain depth, compressing the ground underneath and forcing it into the chamber and part of the discharge tube. The excavating apparatus may be introduced after the caisson has sunk as far as it will of its own weight. If not already in the concrete caisson, the excavating apparatus is then introduced and some or all of the nozzles utilized to clear the tube. The excavating apparatus will gradually work down to the chamber and start to blow out the contents thereof. In the form illustrated in Figure 1, water and air are forced into the chamber 2, the water acting principally to loosen up or soften the material and the compressed air to excavate or disintegrate the material and force the excavated material out through the tube 7 which is of relatively small diameter so as to obtain a sufficiently high velocity of fluid flow to eject the material through a considerable height, the upward movement of the material being assisted by additional or booster jets of air delivered upwardly through the ends of the tubes 27 which project into the tube 7. When desired the crank 18 is turned during the sinking of the caisson thus changing the direction of flow of the air and water from the nozzles into the chamber 2. To facilitate operation of the crank 18, provision is made of a platform 28 to support a man while operating the crank. As best shown in Figure 3, the tubes 10 are held in place by brackets or loops 29 secured to the tube 7 and suitable blocks 29' in said loops and the tubes 27 are similarly held in place by brackets 30 and blocks 30'. When the caisson 1 has been sunk to the required depth, the apparatus supported by the caisson 1 is removed therefrom and the interior of the caisson is filled with concrete or other suitable material, the operating devices then being available for use in other caissons. The rate at which the caisson descends may be assisted by weighting or retarded by jacking up to suit the condition of the ground in which it is being sunk.

In the caisson 31 shown in Figure 4, there is at the lower end a steel sleeve 32 which at its upper end is flush with the concrete of the body and at its reduced lower end is reinforced by a ring 33, the lower edge of the structure forming an annular cutting edge to facilitate sinking of the caisson. Within the sleeve 32 is fitted a member 34 of which the upper end is in the form of a sleeve 36, which forms the lower end of an exhaust passage 37 extending upwardly through the concrete which at its lower end rests on the member 34. Immediately below the sleeve 36, the member 34 flares outwardly to form the upper wall or roof of the chamber 35. In longitudinal grooves 38 at the outer surface of the caisson 31, there are tubes or pipes 39 through which fluid air is supplied to nozzles 40 opening into the chamber 35, where the fluid air serves to loosen the material and to force it up the discharge passage 37. Inside the tubes 39 are tubes 41 which are used preferably for supplying water to the chamber, the space between the tubes 41 and the tubes 39 being used for furnishing air to the chamber. After the sinking of the caisson 31 has been completed, the tubes 39 and 41 are removed from their nozzle ends which are secured in the member 34 forming the roof of the chamber 2. Preferably the nozzles 40 are so arranged as to cause fluid passing therefrom to whirl about the axis of the caisson.

In using caissons such as shown in Figure 1 or in Figure 4 it may be that the surface of the material in the lower chamber is too flat and hard to be loosened easily by the stream of fluid and to obviate any difficulty of this kind provision may be made of suitable mechanical means for insuring breaks or recesses in the surface of the material at such locations as to be struck by the jets of fluid from the nozzles, thus facilitating the breaking up of the material. Preferably such breaking up of the surface may be effected by angle pieces 44, secured to the walls of the lower chambers as indicated in Figure 4, such angle pieces providing blades with sharp lower edges and inclined to the vertical to open up cuts of greater width than the blades, the blades being so positioned that while the jets of fluid from the corresponding nozzles pass over the blades they will strike in the cuts made by said blades. In Figure 1, the nozzles are rotated but the knives are so positioned that at certain times the jets from the nozzles will enter said cuts.

In Figure 6 there is disclosed a concrete caisson 45 having at its lower end an annular metal extension or sleeve 47 which in connection with an inverted funnel member 48 resting on a shoulder on the inside of said sleeve 47 and reinforcing members 49 secured to said sleeve 47 and member 48 forms a suitable base for the concrete caisson 46. It will be seen that the upper end of the member 48 is in the form of a sleeve 50 of which the inner surface is flush with the inner surface of the concrete caisson 46. At its lower edge the sleeve 47 is provided with a cutting edge 51 to enable the caisson to be sunk more easily. The caisson is also provided with a tube 52 which fits into the interior of the caisson 46 and is so supported as to bring its lower end substantially even with the lower end of member 48. Mounted within the tube 52 is a discharge tube or pipe 53 spaced inwardly from the tube 52 and permitting the insertion therebetween of fluid-supply pipes 54 and flared outwardly at its lower end to engage the lower end of the tube 52 to which it is connected as by welding. At its flared lower portion the tube 53 is provided with openings through which the tubes 54 project, the lower ends of such tubes 54 forming parts of nozzles 55. Inside said tubes 50 are smaller tubes 56 through which water is supplied, the spaces between the tubes 56 and 54 being utilized to supply air to the chamber 57 at the bottom of the caisson. It should be understood that the nozzles 55 are so inclined as to throw the fluid outwardly along the wall of the chamber 57 and preferably around the axis of the chamber to cause a whirling motion of the fluid and the excavated material.

The tubes 52 and 56 are preferably supported as follows: The tubes 52 are suspended from the bottom wall of a casing 58 which also serves to support the discharge tube 53, the casing 58 being supported on the top of the caisson 46 by means of outer and inner supports 59 and 60. Above the floor 61 of said casing 58 the tubes 52 are connected by the tubes 62 with an annular supply pipe 63 to which air is furnished by hose 64 and the inner tubes or pipes 56 extend through the upper ends of the tubes 52 to an annular supply pipe 65 connected in turn with a supply hose 66.

As illustrated in Figure 8, caissons of considerable cross sectional area may be used by dividing their bases by suitable partitions into a plurality of chambers and providing discharge passages or pipes and fluid-supply passages or pipes for each one of said compartments. Preferably, this form of caisson 70 is formed of concrete with a plurality of discharge passages or pipes 71 extending upwardly therethrough from bottom chambers 72 of which the outer walls may be formed by a metal frame 73 extending around the bottom of the caisson 70. The main chamber formed by the frame 73 is divided into the chambers 72 by means of a partition 74, the tops of the chambers being formed by members 75 converging upwardly to the lower ends of the passages 71 and there extending horizontally inwardly in the form of annular flanges 76 on which rest members 77 connecting them with the outer walls of the frame and with the partition 74, said members 77 supporting in turn the horizontal flanges of vertical sleeves 78 of which the inner surfaces are flush with the inner surfaces of the passages 71. Mounted in the passages 71 are structures 79 comprising outer tubes 80, inner tubes 81 spaced therefrom throughout the greater part of their lengths and flaring outwardly at their lower ends to abut against the outer tubes 80 at their lower edges, the two tubes being preferably connected along the lines of contact as by welding. Between the tubes 80 and 81 are arranged sets of outer and inner tubes 82 and 83 respectively, terminating at their lower ends in nozzles 84, these tubes being parts of the removable structures 79, substantially like that shown in the lower part of Figure 6. When the caisson 70 is sunk to the desired depth the structures 79 are removed from the discharge openings in the caisson and the openings and passages then filled with concrete or other suitable material.

As shown in Figure 9 a number of such caissons 70 may be combined to form a wall. For convenience the three caissons shown in Figure 9 are denoted by 70', 70" and 70'". In this arrangement the caisson 70" is provided with an angular member 85 against which the inner face of caisson 70' is guided and the caisson 70' at its outer face is provided with a flat guiding member 86 engaging one end of the caisson 70". At its other end the caisson 70" is provided with projecting guide plates 87 between which one end of the caisson 70'" is guided and confined. In order to bind the caissons together in a better manner and to provide a water tight connection therebetween each caisson is provided at its ends or at other suitable places along its sides with vertical grooves 88 preferably of semi-circular cross section and, when such grooves in successive caissons are brought into registry, any soil which may have entered may be blown out and the grooves may be filled with concrete or other cementitious material, thus binding the caissons together and forming a water tight connection therebetween.

As illustrated in Figures 10 and 11 the present invention may be applied to the sinking of steel caissons 90, which may be relatively light in weight and will not ordinarily sink into the soil of their own weight regardless of the removal of the material from their interiors. In this class of work it is necessary to utilize suitable steam hammers 91 normally supported on anvils 92 which in turn are supported on the upper edges of caissons 90. In the form of apparatus for loosening up the material and removing it from the caisson 90, shown in Figure 10, there is a discharge pipe 93 extending axially of the tube and curved out to one side, the anvil 92 being arched to provide for such curved portions of the exhaust pipe 92. The discharge pipe 93 may be supported by means of a frame 94 extending across the caisson 90 and resting on the upper edge thereof. The lower end of the discharge passage or tube 93 is fitted into a sleeve 95 which is provided with a shoulder against which the lower end of the discharge pipe 93 rests and with a lower flared portion 96 terminating at its lower edge with an annular flange 97. Surrounding the sleeve 95 is a casing 98 of which the side walls rest on the annular flange 97.

Inside the casing 98 is mounted an annular air supply pipe 99 from which nozzles 100 extend through openings in the annular flange 97, each of such nozzles consisting of an outer tube 101 and an inner tube 102 of which the outer tube is connected with the air supply pipe 90 and the inner tube 102 is connected with an annular water supply pipe 103 immediately above the annular air pipe 99 and connected with the pipes 102 by extensions of said pipes 102 through the annular air supply pipe 99. Water is supplied to the annular water pipe 99 through a hose 104 and a pipe line 105 which is secured to the pipe 93 by suitable clamping means; and air is supplied to the annular pipe 103 by a hose 106 and pipe line 107 supported on the exhaust pipe 93 by clamping means 108 similar to the clamping means used for supporting the pipe line 105. In order to provide a substantially fluid tight fit beween the casing 98 and the caisson 90 above a chamber 109, a tube or tire 110 extending around the casing 90 is connected for inflation with a flexible tube 111 which may be connected with the pipe line 105. With this arrangement the tube 110 will be deflated during insertion and removal of the fluid-jet apparatus but, when such apparatus is placed in the caisson 90 and fluid supplied to the nozzles the tube 110 will be inflated and a substantially fluid-tight fit effected around the casing 98.

The apparatus disclosed in Figure 11 is similar in many respects to the apparatus shown in Figure 10, inasmuch as it is applicable to a steel caisson 90 driven by hammer 91 and has a lower casing 112 surrounded by a sealing tube or tire 113 connected by means (not shown) with a fluid-supply. In this form, however, there are two discharge pipes 114 and 115 which may be supported at the top of the caisson 90 by a support similar to that shown in Figure 10. At their lower ends these discharge tubes 114 and 115 are connected with helical ducts 117 and 118 respectively, said passages extending around a central cylindrical casing 119. In this form of apparatus air is supplied by a hose 120 to an axially arranged pipe 121 and water is furnished through a hose 122 connecting with a pipe 123 which extends axially through said pipe 121. At its lower end the pipe 121 is connected with a cylinder 124 by a coupling which permits rotation of said cylinder 124 in said cylinder 119 which has at its lower end nozzles 126 so arranged that the air passing therethrough will tend to cause such rotation. As clearly shown in Figure 14, the tube or pipe 123 passes through the lower wall of the cylinder 124 and supplies water to the chamber 127 at the bottom of the caisson 90.

Figure 16:
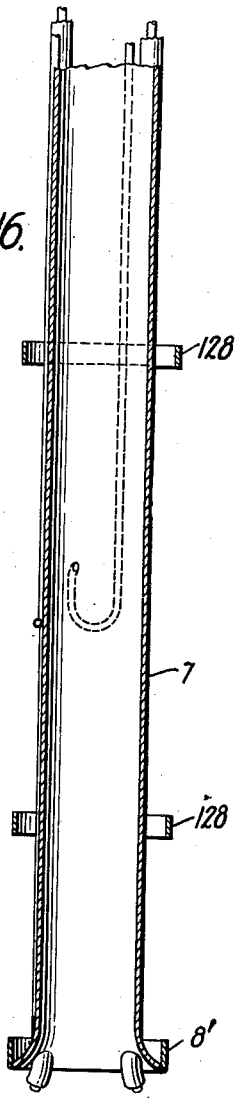
Figure 16 is a view of a discharge tube provided with jets having the same general arrangement as in Fig. 1 but with the tube around the jet pipes replaced by other holding means.
Figure 15:
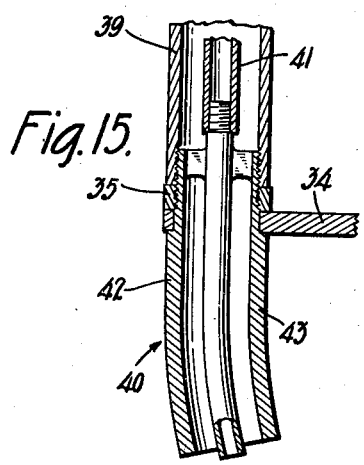
Figure 15 is a detail sectional view illustrating the means of attaching the fluid-supplying tubes to the nozzles at the lower end of Figure 11.

In Figure 16, there is shown another form of arrangement which can be used in the caisson 1 of Figure 1. In this case the tube 7 is connected at its bottom with a relatively narrow sleeve 8' and the holding means for the tubes 7 and 27 are replaced by rings 128.

In some weak or unstable soils, such as quick sand soil, where the carrying capacity of the strata of the soil is insufficient for the support of concentrated loads, a solution of the problem is to make the footing of the foundation of greater area than otherwise, as for example by sinking caissons having their lower ends of greater cross-sectional area than the main portions of the caissons. The problem just stated may be solved by use of the structure shown in Fig. 17 according to the method there indicated.

Figure 17:
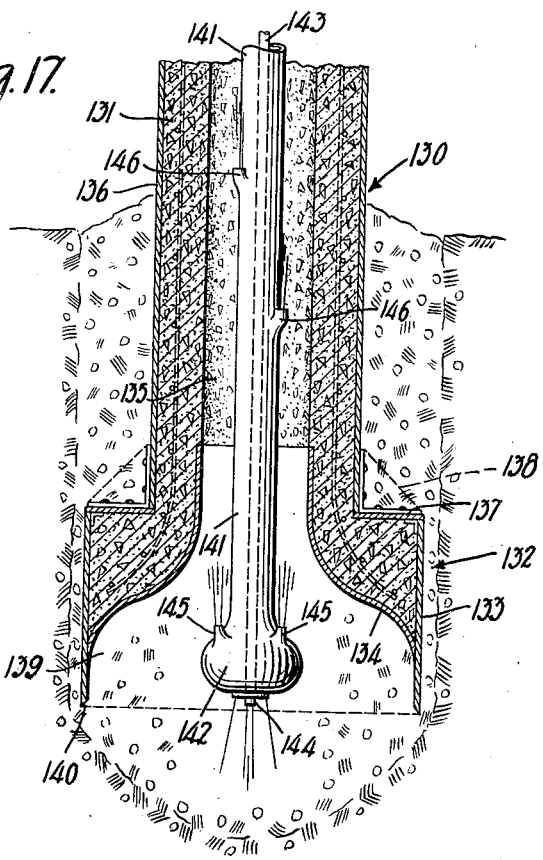
Figure 17 is a view in vertical section of another form of caisson.
Figure 18:
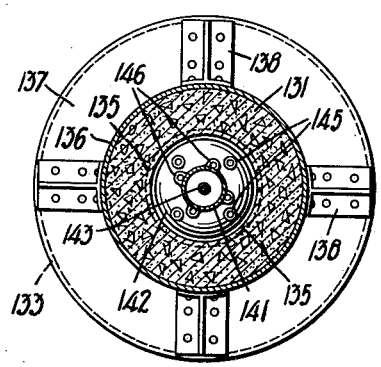
Figure 18 is a cross section of the structure shown in Fig. 17.

In Fig. 17, there is disclosed a caisson 130 adapted for use in such unstable soil and comprising a body portion 131 and a footing portion 132 of greater cross section. The caisson 130 may be formed principally of reinforced concrete which is enclosed at the foot by a peripheral casing 133, a stream-line lining 134 being attached at its lower edge to the casing 133 as by welding and communicating at its top with a discharge passage or pipe 135. The body portion 131 may also be surrounded by a casing 136, the top of the footing portion 132 being covered by a sheet metal member 137 attached to the upper end of the casing 133 in any suitable manner and attached to the casing 136 as by brackets 138.

The lining 134 is of such shape as to provide a chamber 139 which extends down to the level of a cutting edge 140 at the lower end of the footing 132. The caisson will sink to some extent at least by gravity but to insure such sinking and to enable it to be sunk with sufficient speed, fluid, air and water for example, are supplied to the chamber 139 to loosen the soil and discharge it through the passage or pipe 135. The fluid-supplying means may be supported in any suitable manner on the top of the caisson and may comprise an air tube 141 terminating in a hollow bulb 142 and a water pipe 143 extending down through the bulb 142 and terminating in a nozzle 144. The bulb 142 may be of such shape and position to give a stream line effect. The bulb 142 is provided with upwardly directed air nozzles 145 and the air tube 141 is provided with upwardly directed air nozzles 146 to increase the velocity of the upward fluid current in the discharge 135.

After the caisson 132 has been sunk to the required depth the air pipe or tube 141, together with the water tube 143 attached thereto, is withdrawn from the caisson 130 which is then filled with suitable material such as concrete. This caisson 130 may be sunk in the same general manner as the caisson illustrated in Fig. 1 but when it is sunk in soil which is particularly suitable for use with water jets, not only may the chamber 139 be made shallower but by use of a more powerful current of compressed air, the soil or ground may not only be blown out of the discharge tube but may be forced out around the cutting edge of the caisson and up outside the chamber to fill the cavity above the footing. Where the soil is not forced out around the cutting edge, the cavity above the footing is filled by the flow of the surrounding soil into the cavity or by actually filling the cavity in any desired manner. The cavity may be filled by matter discharged over the top of the caisson. It should be understood that caissons for use by this method may be of various shapes and there may be a plurality of column portions for a single base. Obviously the air tube and water tube structure are available for use with other forms of caissons. By this system of caisson sinking, it is possible to effect a great saving in material, labor and weight of foundation.

The new system and apparatus give rise to many advantages, for example, all of the digging operations which are ordinarily done in caisson chambers under pneumatic pressure and under very unhealthy conditions by men, are by the present system done by physical and mechanical means producing the same results but much more rapidly. Discarding, however, the comparison with hand excavated caissons of which the use is limited only to very specific soils and can not be used for any substantial depth, another advantage of this method is that it brings on the market a unit for foundations which at present does not exist and which is very much needed. For instance, with a section of 10–15 square feet (or 3½ to 4½ ft. in diameter) and depth from 50–80 ft. the carrying capacity of a single caisson may be 200–300 tons which equals the carrying capacity of a considerable number of piles or steel cylinders and is about one-half to one-third of the carrying capacity of one of the smallest pneumatic caissons 6 ft. in diameter. Furthermore, no vacuum or suction is produced by the operation of the jets or the current but on the contrary the work when required maybe done under a constant pressure. Even when using the compressed air there is a tendency rather to force the material from the interior of the chamber to the outside thereof if its walls are shallow than to suck the soil or material from the outside into the interior of the chamber. This is a very important feature for it tends to maintain the stability of adjacent buildings and the integrity of the soil which serves to support the caisson laterally. Other advantages of the new method arise from its flexibility. By varying the positions of the nozzles and of the discharge device according to the problem and by varying the shape of the caisson to suit the superstructure, many foundation problems may be solved economically. There is no danger of vibration and the speed of operation is so much greater than that obtained by hand labor as not to be comparable therewith.

It should be understood that the disclosure of apparatus and process of the invention is merely illustrative and that various changes may be made in the apparatus and in the steps of the method without departing from the true spirit and scope of the invention.

Having thus described my invention, I claim:

1. The combination with a caisson having in its lower end a downwardly open chamber normally sealed by material in which the caisson is being sunk and a passage extending from said chamber toward the upper part of the caisson, of an excavating and discharging device comprising a central discharge tube extending upwardly through the centre of said passage, pipes arranged around the inside of said passage with their lower ends projecting into said chamber through said tube at points arranged around the lower end of said passage, and means for rotating said pipes.

2. The combination with a caisson having at its lower end a downwardly open chamber normally sealed by material in which the caisson is being sunk and a passage extending from said chamber toward the upper part of the caisson and of relatively small section to enable excavated material to be forced upwardly therethrough by a compressed air stream, of means for introducing compressed air and water to the chamber at the bottom of the caisson in concentric jets including double pipes extending from a source of supply of said compressed air and water to said chamber, and means for rotating said double pipes.

3. A caisson having a chamber in the bottom thereof and a discharge passage forming the only upward means of communication from the chamber, water jets issuing into said chamber, mechanical means in said chamber for breaking up material entering the chamber, and compressed air jets also issuing in said chamber for further breaking up said material and expelling the broken-up material by their flow through the discharge passage.

4. A caisson having in the bottom thereof a downwardly open chamber, the top of which tapers into a discharge passage whilst the enclosing wall has a relatively sharp lower edge to facilitate the downward movement of the caisson, nozzles directing compressed air and water into said chamber and cutting devices arranged around the interior of the chamber wall to make cuts in the material in positions to receive the jets from said nozzles.

5. A caisson having in the bottom thereof a downwardly open chamber, the top of which tapers into a discharge passage whilst the enclosing wall has a relatively sharp lower edge to facilitate the downward movement of the caisson, compressed air and water delivery nozzles directing fluid into said chamber, and cutting blades projecting into said chamber below the nozzles, said blades being inclined to the horizontal plane to make relatively wide cuts in the material entering said chamber and being so positioned with reference to the nozzles that the compressed air and water from said nozzles enters the cuts.

6. A method of sinking a caisson by causing compressed air jets to issue into a chamber in the bottom of the caisson so as to produce a whirling motion therein whereby the ground is loosened, excavated and blown out through a discharge passage of restricted cross section extending through the caisson upwards from said chamber.

7. A caisson having at its lower end a downwardly open chamber and having an open passage extending from said chamber to the upper part of the caisson and of relatively small cross section, and air jetting means in said chamber at an angle to the caisson axis for excavating the ground with a whirling motion and blowing it out through said passage.

8. The combination with a caisson having in its lower end a downwardly open chamber which receives the ground to be excavated and in which the caisson is being sunk, and a discharge passage of relatively small cross section extending upwards from the top of said chamber, of means for supplying compressed air and water both in jet form to said chamber to loosen and soften the ground respectively, the compressed air blowing the loosened material through the passage.

9. The combination with a caisson having at its lower end a downwardly open chamber normally sealed by the material in which the caisson is being sunk and a passage through the caisson from the top of said chamber, of apparatus insertable through said passage way including a pipe of relatively small cross sectional area for the discharge of material from the chamber, including concentric pipes for introducing compressed air and water to the said chamber, in concentric jets, and controlling means for the air and water.

In testimony whereof I affix my signature.

ALEXANDER G. ROTINOFF.